United States Patent
Shi

(10) Patent No.: US 9,994,745 B2
(45) Date of Patent: Jun. 12, 2018

(54) TRANSPARENT ORGANOSILICON GEL ADHESIVE

(71) Applicant: SUZHOU T-POWER OPTRONICS TECHNICAL SERVICE CO., LTD., Jiangsu (CN)

(72) Inventor: Dong Shi, Suzhou (CN)

(73) Assignee: SUZHOU T-POWER OPTRONICS TECHNICAL SERVICE CO. LTD, Suzhou (CN)

( * ) Notice: Subject to any disclaimer, the term of this patent is extended or adjusted under 35 U.S.C. 154(b) by 0 days. days.

(21) Appl. No.: 15/129,374

(22) PCT Filed: Dec. 1, 2014

(86) PCT No.: PCT/CN2014/001069
§ 371 (c)(1),
(2) Date: Sep. 26, 2016

(87) PCT Pub. No.: WO2015/143591
PCT Pub. Date: Oct. 1, 2015

(65) Prior Publication Data
US 2017/0101566 A1    Apr. 13, 2017

(30) Foreign Application Priority Data
Mar. 26, 2014 (CN) .......................... 2014 1 0114522

(51) Int. Cl.
*C09J 183/04*    (2006.01)
(52) U.S. Cl.
CPC ................... *C09J 183/04* (2013.01)
(58) Field of Classification Search
None
See application file for complete search history.

(56) References Cited

U.S. PATENT DOCUMENTS

| 2014/0350176 A1* | 11/2014 | Fisher | C09J 183/12 524/588 |
| 2014/0350278 A1* | 11/2014 | Fisher | C08G 77/442 556/446 |
| 2016/0017185 A1* | 1/2016 | Albaugh | C08K 9/10 428/328 |

FOREIGN PATENT DOCUMENTS

CN    101671483 A    3/2010
CN    102807757 A    12/2012
(Continued)

OTHER PUBLICATIONS

The World Intellectual Property Organization (WIPO) International Search Report for PCT/CN2014/001069 dated Feb. 17, 2015 pp. 1-5.

*Primary Examiner* — Robert S Loewe
(74) *Attorney, Agent, or Firm* — Anova Law Group, PLLC

(57) ABSTRACT

The present invention relates to a transparent organosilicon gel adhesive. The transparent organosilicon gel adhesive is prepared by mixing component A with component B in accordance with the mass proportion of 1:1. The component A is composed of 60-95 parts by weight of base material, 0.1-0.5 part by weight of catalyst and 5-40 parts by weight of auxiliary material, and the component B is composed of 60-95 parts by weight of base material, 5-20 parts by weight of crosslinker, 0.1-0.5 part by weight of inhibitor and 1-20 parts by weight of auxiliary material. The present invention relates to a two-component addition type transparent AB silicone gel adhesive, which has good adhesion to glass, a PC board, PMMA. The present invention has a refractive index of 1.40 to 1.43, is a colorless transparent gel, and has a light transmittance of more than 92%.

9 Claims, 2 Drawing Sheets

(56) References Cited

FOREIGN PATENT DOCUMENTS

| CN | 103613931 A | 3/2014 |
| JP | 2010285571 A | 12/2010 |

* cited by examiner

TRANSPARENT ORGANOSILICON GEL ADHESIVE

CROSS-REFERENCES TO RELATED APPLICATIONS

This application claims the priority of PCT patent application No. PCT/CN2014/001069, filed on Dec. 1, 2014, which claims the priority of Chinese patent application No. 201410114522.4, filed on Mar. 26, 2014, the entire content of all of which is incorporated herein by reference.

TECHNICAL FIELD

The present invention relates to a transparent organosilicon gel adhesive, and particularly relates to an optical transparent organosilicon gel adhesive, which can be used for adhering to glass, a PC board, PMMA and the like, is suitable for processing optical elements such as a touchscreen, a liquid crystal display panel and the like, and belongs to the technical field of novel electronic packaging and protecting materials of organic silicone.

BACKGROUND

In the industry, adhesives suitable for transparent optical elements include an epoxy resin adhesive, a rubber adhesive, a modified acrylic resin adhesive, a polyurethane adhesive and other materials.

The epoxy resin has the disadvantage that the yellowing resistance is poor, and the cracking resistance and shock resistance thereof also have deficiencies. The rubber adhesive has the disadvantage that the storage stability is poor. The polyurethane adhesive has the disadvantage that the temperature resistance is poor, and is easy to hydrolyze at a high temperature. At present, a widely used OCA glue for a touchscreen has larger limitations due to high cost and selling price and complex process.

SUMMARY

The purpose of the present invention is to provide a transparent organosilicon gel adhesive.

To achieve above purpose, the present invention provides a transparent organosilicon gel adhesive, characterized in that the transparent organosilicon gel adhesive is prepared by mixing component A with component B in accordance with the mass proportion of 1:1, wherein the component A is composed of materials of the following proportion by weight:

| | |
|---|---|
| base material | 60-95 parts by weight; |
| catalyst | 0.1-0.5 part by weight; |
| auxiliary material | 5-40 parts by weight; | wherein the catalyst is a platinum-group metal catalyst; the component B is composed of materials of the following proportion by weight:

| | |
|---|---|
| base material | 60-95 parts by weight; |
| crosslinker | 5-20 parts by weight; |
| inhibitor | 0.1-0.5 part by weight; |
| auxiliary material | 1-20 parts by weight; | wherein the base material is at least one of compounds conforming to general formula (1), compounds conforming to general formula (2), compounds conforming to general formula (3) and compounds conforming to general formula (4);

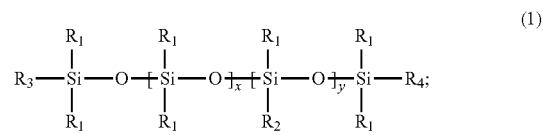

where $R_1$ represents alkyl with the number of carbon atoms of 1 to 6; $R_2$, $R_3$ and $R_4$ represent alkyl with the number of carbon atoms of 1 to 6 or alkenyl with the number of carbon atoms of 2 to 8 respectively and independently; and x is equal to 5 to 40, and y is equal to 1 to 30;

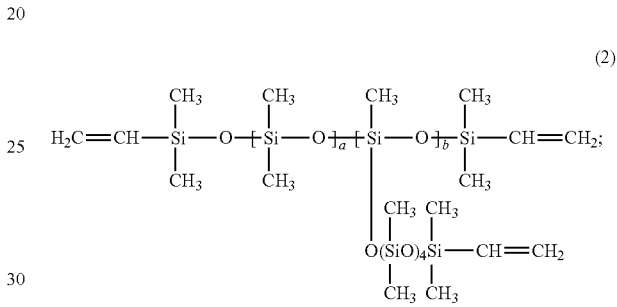

where a is greater than or equal to 20, and b is greater than or equal to 30;

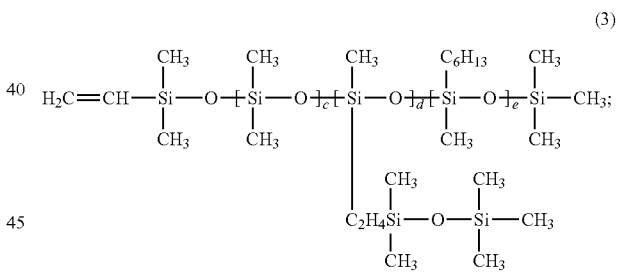

where c is greater than or equal to 20, d is greater than or equal to 30, and e is greater than or equal to 10;

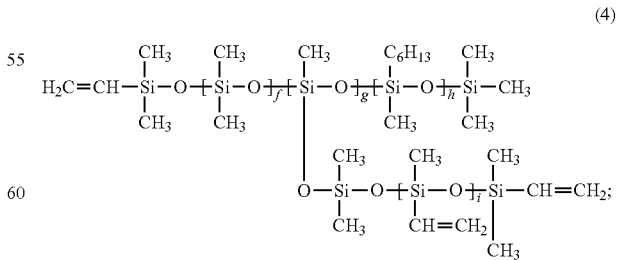

where f is greater than or equal to 30, g is greater than or equal to 10, h is greater than or equal to 10, and i is greater than or equal to 10;

Using a branched silicone oil has the advantages that: with the increase of the viscosity, the branched silicone oil becomes thinner, this shear thinning effect is beneficial to the dispersion of other compositions in silicone gel, the use feeling and adhesive property thereof are better than those of a common linear silicone oil, and the branched silicone oil can improve the flexibility and surface adhesion properties thereof.

the crosslinker is at least one of compounds conforming to general formula (5);

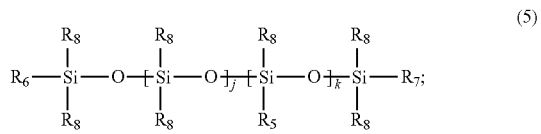
(5)

where Me represents methyl; $R_9$ represents alkyl, cyclopropyl, cyclobutyl, cyclopentyl or cyclohexyl with the number of carbon atoms of 1 to 6 or alkenyl with the number of carbon atoms of 2 to 7; and l is equal to 0 to 1.5, m is equal to 0 to 1.5, and l+m is equal to 1.3 to 1.8;

the auxiliary material also contains an adhesion promoter, wherein the adhesion promoter is prepared by mixing component C and component D, wherein the mass proportion of the component C to the component D is 10 to 90:10 to 90; the component C is at least one of compounds conforming to general formula (7), compounds conforming to general formula (8), compounds conforming to general formula (9) and compounds conforming to general formula (10); the component D is at least one of compounds conforming to general formula (11);

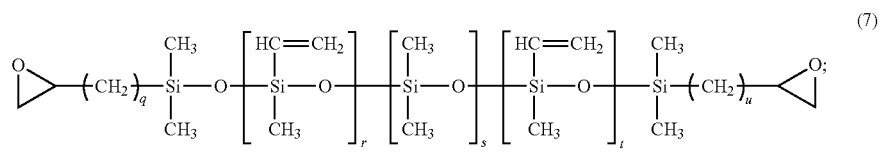
(7)

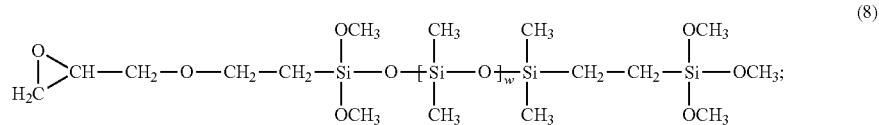
(8)

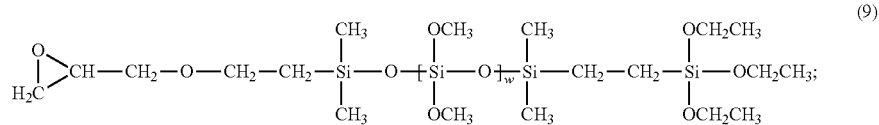
(9)

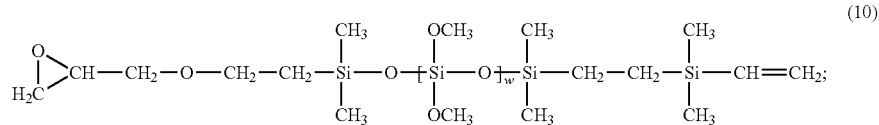
(10)

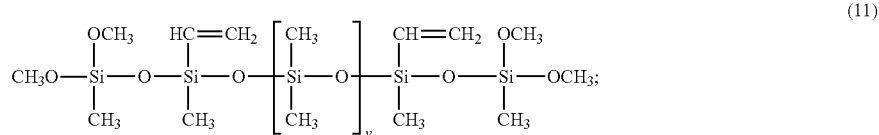
(11)

where $R_8$ represents alkyl with the number of carbon atoms of 1 to 6; $R_5$, $R_6$ and $R_7$ represent alkyl with the number of carbon atoms of 1 to 6 or hydroxyl respectively and independently, and at least one of $R_5$, $R_6$ and $R_7$ is hydroxyl; and j is equal to 10 to 30, and k is equal to 1 to 10;

the auxiliary material contains MQ resin conforming to general formula (6) or a mixture of MQ resin conforming to general formula (6) and vinyl end silicone oil, wherein the mass proportion of the MQ resin to the vinyl end silicone oil is 0.3 to 0.4:0.6 to 0.7;

the auxiliary material also contains MT resin or a mixture of MT resin and vinyl end silicone oil, wherein the mass proportion of the MT resin to the vinyl end silicone oil is 0.3 to 0.4:0.6 to 0.7;

$(Me_3SiO_{0.5})_l(R_9Me_2SiO_{0.5})_m(SiO_2)$ (6);

where q is equal to 3 to 6, r is equal to 2 to 6, s is equal to 6 to 12, t is equal to 2 to 6, u is equal to 3 to 6, v is equal to 6 to 12, and w is equal to 1 to 12;

the inhibitor is at least one of alkynol compounds and alkenyl-containing cyclic siloxane oligomers.

According to the embodiments of the present invention, preferably, the platinum-group metal catalyst is one of chloroplatinic acid, alcohol-modified chloroplatinic acid, platinum-vinyl siloxane composition, chloroplatinic acid-alkene complex and platinum-alkene composition.

As an addition type catalyst, a platinum group metal catalyst needs to have good storage stability and have better compatibility with a gel and suitable catalytic activity. The range of the content thereof is 0.0005-0.6%, which is specifically decided by the content of platinum.

The addition amount of a catalyst only needs to satisfy the requirement of serving as a catalyst for a hydrosilylation reaction effectively, and the amount can be changed according to a desired curing rate. If the amount is too large, the reaction will become uneconomical.

Using the above-mentioned further solution has the beneficial effects that: a silicon-hydrogen addition reaction can be regulated by selecting a suitable catalyst, to prepare gels in different curing conditions as requested, and the gels can be made to have some flame retardant properties by appropriately increasing the amount of the platinum catalyst.

According to the embodiments of the present invention, preferably, the platinum-group metal catalyst is platinum-vinyl siloxane composition.

According to the embodiments of the present invention, preferably, the inhibitor is selected from 3-methyl-1-butyn-3-ol, 3-methyl-1-pentyn-3-ol, 3,5-dimethyl-1-hexyn-3-ol, 1-hexynyl-1-cyclohexanol, 3-phenyl-1-butyn-3-ol, 2-methyl-3-butyn-2-ol, tetravinyl tetramethylcyclo tetrasiloxane, pyridine and unsaturated acylamide. The vulcanization speed can be regulated by adding an inhibitor, to satisfy suitable working time and storage life, thereby ensuring the requirement of storage stability of silicone gel. The optimal mole ratio of the inhibitor alkynol to the platinum group metal catalyst is 40, if the mole ratio is too high, the surface of the gel is not smooth, and if the mole ratio is too low, the curing speed is too fast, which causes the reduction of working time and is not economical.

According to the embodiments of the present invention, preferably, alkenyl in the compound conforming to general formula (1) is vinyl, allyl, butenyl, pentenyl, hexenyl or heptenyl.

According to the embodiments of the present invention, preferably, $R_1$ and $R_2$ in the compound conforming to general formula (1) represent methyl, and $R_3$ and $R_4$ represent vinyl, wherein the content of vinyl is 0.005-0.5 wt %; and the viscosity of the compound conforming to general formula (1) is 300-30,000 cP; Using the technical solution has the advantages that: as a base material, a linear vinyl silicone oil can regulate the viscidity of a product, double bonds are concentrated at both ends, a main chain of a molecule is alkane with a long chain, a side chain has no substituent group, and internal friction resistance generated by the molecule during segment motion is less, thereby reducing internal consumption.

Alternatively, $R_1$ in the compound conforming to general formula (1) represents methyl, and $R_2$, $R_3$ and $R_4$ represent vinyl, wherein the content of vinyl is 0.01-10 wt %; and the viscosity of the compound conforming to general formula (1) is 50-10,000 cP; Using the technical solution has the advantage that: vinyl of the side group can increase more crosslinking points, thereby improving glass strength of the final gel and other mechanical properties.

Alternatively, $R_1$, $R_2$ and $R_3$ in the compound conforming to general formula (1) represent methyl, and $R_4$ represent vinyl, wherein the content of vinyl is 0.001-0.5 wt %; and the viscosity of the compound conforming to general formula (1) is 500-10,000 cP. Using the technical solution has the advantages that: for the gel, the viscosity of the gel is regulated by a plasticizer, the properties of the gel on an optical device are influenced seriously since using polydimethylsiloxane without a reactive and active group may cause oil leakage in a long-term condition, while a linear silicone oil with a reactive and active group at a single end not only can regulate the final viscosity of a product, but also can be used as a reactive group to conduct reaction, which may not cause oil leakage of the final product.

According to the embodiments of the present invention, preferably, $R_5$ and $R_8$ in the compound conforming to general formula (5) represent methyl, and $R_6$ and $R_7$ represent hydroxyl, wherein the content of hydrogen contained in the compound conforming to general formula (5) is 0.005-1 wt %; and the viscosity of the compound conforming to general formula (5) is 5-200 cP; Using the technical solution has the advantages that: the linear hydroxyl-containing silicone oil can be used as a crosslinker and can also be used as a chain extender, and polymethylhydrosiloxane packaged by a $Me_3SiO_{0.5}$ chain link therein can be used as an antiyellowing agent. Active hydrogen-endcapped organic hydrogen-containing polysiloxane has higher activity, and the strength and toughness of the silicone gel can be improved by regulating the addition amount thereof, so that the product has good mechanical properties.

Alternatively, $R_6$, $R_7$ and $R_8$ in the compound conforming to general formula (5) represent methyl, and $R_5$ represents hydroxyl, wherein the content of hydrogen contained in the compound conforming to general formula (5) is 0.005-2 wt %; and the viscosity of the compound conforming to general formula (5) is 10-100 cP; Using the technical solution has the advantages that: hydroxyl of the side group can increase more crosslinking points, and therefore, the crosslink density is high, thereby improving the strength and toughness of the final gel and other mechanical properties.

Alternatively, $R_8$ in the compound conforming to general formula (5) represents methyl, and $R_5$, $R_6$ and $R_7$ represent hydroxyl, wherein the content of hydrogen contained in the compound conforming to general formula (5) is 0.001-10 wt %; and the viscosity of the compound conforming to general formula (5) is 10-300 cP. Using the technical solution has the advantages that: the hydrogen-containing silicone oil can provide the mass fraction of active hydrogen which can be controlled, and the higher the mass fraction of the active hydrogen is, the more the active points participating in a crosslinking reaction are, the higher the reaction activity is, and the larger the crosslink density is. The surface of a crosslinking agent has some autoadhesion by regulating the type and dosage of a crosslinking composition, so that the crosslinking agent is attached to the surface of the device. The proportion of silicon hydrogen to vinyl is generally regulated to 0.5-1.0 using the above-mentioned base material.

According to the embodiments of the present invention, preferably, in the MQ resin, $R_9$ represents methyl, wherein the ratio of M to Q of the MQ resin is 0.6 to 1.2; Using the technical solution has the advantages that: methyl MQ resin has certain heat resistance and low-temperature resistance, has certain flexibility, is hard, but is not fragile, and has aging resistance, ultraviolet resistance and water resistance, and can reduce the linear shrinkage rate of the final product because of no active group, so that the methyl MQ resin can be used on the optical device better.

Alternatively, in the MQ resin, $R_9$ represents vinyl, wherein the content of vinyl is less than or equal to 10 wt %. Using the technical solution has the advantages that: as a reinforcing agent, vinyl MQ resin has good compatibility and dispersibility, and a siloxane link has a reinforcing effect and can react with the crosslinker, to generate firm chemical bonding, thereby improving the mechanical properties. The vinyl MQ resin is also used as a tackifier, with the addition of the MQ resin, an organic chain link can be introduced, which plays a tackifying role, without influencing the viscosity of a system, influencing light transmittance and changing the brittleness temperature of a base gel, so that the vinyl MQ resin keeps good low-temperature adhesion, and may not loss adhesion even if achieving a glass transition temperature, and the better compatibility and light transmittance thereof satisfy the requirement of use on the optical device. The mechanical properties and flame resistance properties of silicone gel are improved by regulating the crosslink density, so that the vinyl MQ resin has better high and low-temperature resistance properties, thereby keeping the inherent adhesive strength and flexibility.

According to the embodiments of the present invention, preferably, the ratio of M to Q of the MQ resin is 0.8. If the M/Q ratio is small, the manufacture is difficult, and it is easy to gel, while if the M/Q ratio is large, the MQ resin is liquid, the molecular weight is low, and the cohesive energy between molecules is reduced, so that the mechanical properties cannot be improved better.

The silicone gel has adhesiveness from a non-crosslinking functional group on the surface, and the product displays adhesiveness by adding an MQ resin tackifying composition, or regulating the addition amount of non-reactive adhering compositions, the side chain length of a non-crosslinking functional group, the type of an end functional group, and the like. When being a solid white powder, the MQ resin needs to be mixed with vinyl end silicone oil to form a liquid mixture, the proportion of mixture of resin to silicone oil is 0.3:0.7, selectively, 0.4:0.6.

1. In the above-mentioned solution, the method for measuring the hydrogen content of the hydrogen-containing silicone oil refers to the article entitled "HNMR measurement of hydrogen content and molecular weight of hydrogen-containing silicone oil" issued in Chinese Journal of Spectroscopy Laboratory, Vol. 28, Iss 3.

Since the above-mentioned technical solution is used, the present invention has the following advantages and effects as compared with the prior art:

1. The present invention relates to a two-component addition type transparent AB silicone gel adhesive (hereafter referred to as a silicone gel adhesive), which has good adhesion to glass, a PC board, PMMA, and these materials are frequently-used materials for touchscreen cover plates. The silicone gel adhesive has the characteristics of low cost, simple process operation and the like; has a refractive index of 1.40 to 1.43, is a colorless transparent gel, has a light transmittance of more than 92%, has a certain elasticity and resilience, can resist external shocks, and can keep permanent adhesiveness; and can be completely cured at room temperature or heating temperature, thereby having good economy and reliability.

2. The adhesion promoter of the present invention is an interface reinforcing agent with excellent properties, which can improve the adhesion capability between the silicone gel and the surface to be adhered.

DETAILED DESCRIPTION

Figure 1:
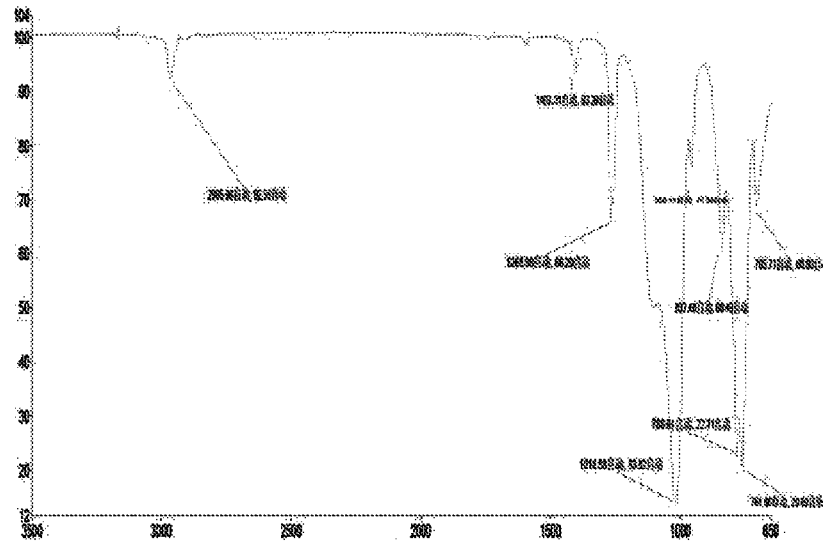
FIG. 1 is an infrared spectrogram of an MT silicon resin.

The present invention will be described in detail below in combination with the drawings and the embodiments.

Embodiment 1: A Transparent Organosilicon Gel Adhesive

1. A transparent organosilicon gel adhesive. The transparent organosilicon gel adhesive is prepared by mixing component A with component B in accordance with the mass proportion of 1:1, wherein the component A is composed of materials of the following proportion by weight:

| base material | 60 parts by weight; |
|---|---|
| catalyst | 0.1 part by weight; |
| auxiliary material | 5 parts by weight; | wherein the catalyst is a chloroplatinic acid;
the component B is composed of materials of the following proportion by weight:

| base material | 60 parts by weight; |
|---|---|
| crosslinker | 5 parts by weight; |
| inhibitor | 0.1 part by weight; |
| auxiliary material | 1 part by weight; | wherein the base material is a compound conforming to general formula (1).

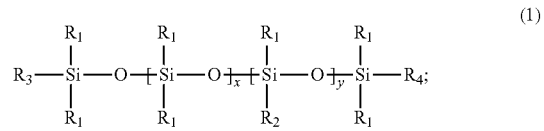

In the general formula, $R_1$ and $R_2$ in the compound conforming to general formula (1) represent methyl, and $R_3$ and $R_4$ represent vinyl, wherein the content of vinyl is 0.05 wt %; the viscosity of the compound conforming to general formula (1) is 10,000 cP; and x is equal to 10, and y is equal to 15.

The crosslinker is a compound conforming to general formula (5).

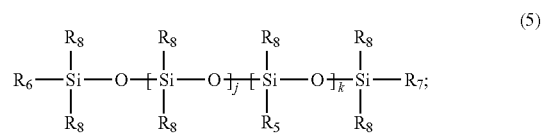

In the general formula, $R_5$ and $R_8$ in the compound conforming to general formula (5) represent methyl, and $R_6$ and $R_7$ represent hydroxyl, wherein the content of hydrogen contained in the compound conforming to general formula (5) is 0.05 wt %; the viscosity of the compound conforming to general formula (5) is 90 cP; and j is equal to 10, and k is equal to 5.

The auxiliary material contains MQ resin conforming to general formula (6).

The auxiliary material also contains MT resin.

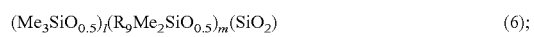

In the general formula, Me represents methyl, and R9 represents methyl; l is equal to 1, m is equal to 0.8, and l+m is equal to 1.8; and the ratio of M to Q of the MQ resin is 0.8.

The auxiliary material also contains an adhesion promoter, wherein the adhesion promoter is prepared by mixing component C and component D, wherein the mass proportion of the component C to the component D is 30:70; the component C is a mixture composed of a compound conforming to general formula (7), a compound conforming to general formula (8), a compound conforming to general formula (9) and a compound conforming to general formula (10); the component D is a compound conforming to general formula (11).

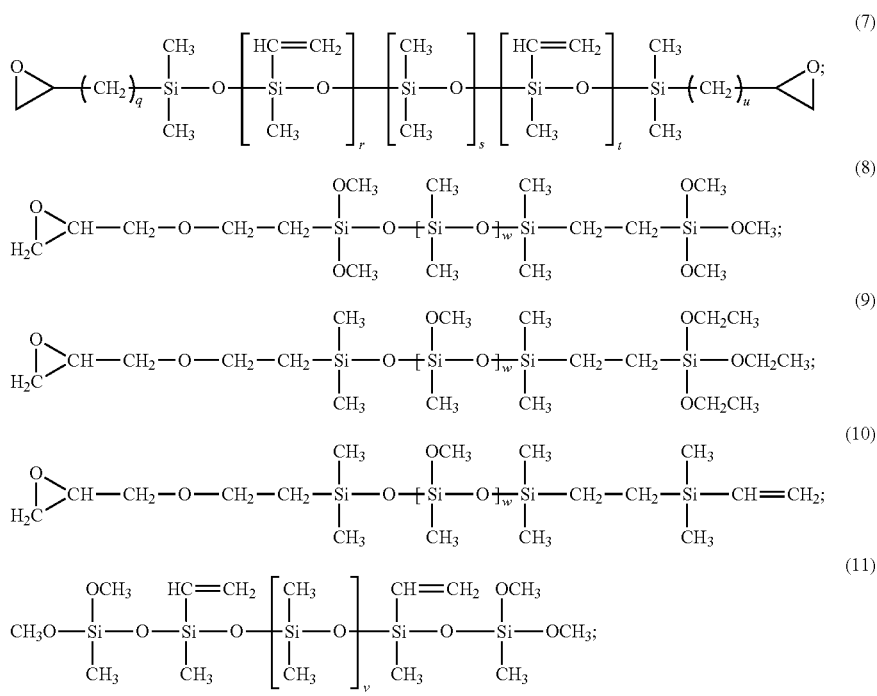

In the general formula, q=3, r=2, s=6, t=2, u=3, v=6, w=3.

The mass proportion of the compound conforming to general formula (7) to the compound conforming to general formula (8) to the compound conforming to general formula (9) to the compound conforming to general formula (10) is 1:1:1:1.

The preparation method for the adhesion promoter comprises: weighing component C and component D according to weight, and then uniformly mixing same.

The preparation method for MT resin comprises the following steps:

Step 1: adding anhydrous toluene, absolute ethyl alcohol and methyltrimethoxysilane into a reaction vessel; then under the condition of 50-70° C. and under the condition of nitrogen protection, specifically referring to both the temperature condition and the nitrogen protection condition are necessary under the condition of placing the reaction vessel in nitrogen atmosphere, first adding trifluoromethanesulfonic acid as a catalyst into the reaction vessel, and then dropwise adding acetic acid into the reaction vessel to make the methyltrimethoxysilane react with the acetic acid to prepare an intermediate product, wherein the mole ratio of the methyltrimethoxysilane to the acetic acid is 1:1;

Step 2: removing the solvent in the reaction vessel, wherein the specific method for removing the solvent comprises heating and evaporation;

Step 3: adding 1,1,3,3-tetramethyldisiloxane into the reaction vessel under the condition of 80-100° C., and then dropwise adding acetic acid into the reaction vessel, wherein the acetic acid reacts with the intermediate product prepared in step 1 to generate silicon hydroxyl, wherein the silicon hydroxyl is endcapped by the 1,1,3,3-tetramethyldisiloxane to prepare MT resin; and conducting cooling, water scrubbing and distillation to obtain the pure MT organosilicon resin, wherein the mole ratio of the 1,1,3,3-tetramethyldisiloxane to the methyltrimethoxysilane is 1:0.5, and the mole ratio of the acetic acid to the methyltrimethoxysilane is 1:1.

The simplified planer structural formula of the prepared MT resin is shown as follows, wherein the part not shown is a repeated silica structure unit.

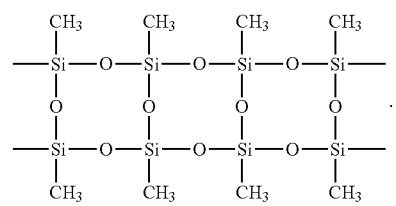

The simplified stereographic graphics of the prepared MT resin is shown as follows:

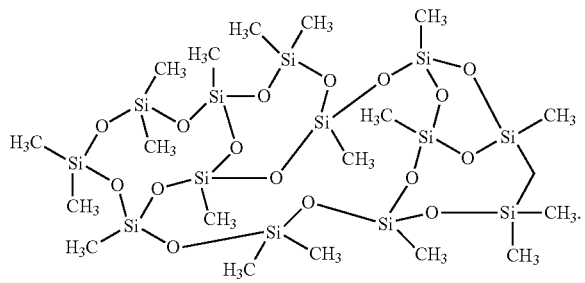 [SMILES: C[Si]1(C)C[Si]2(C)O[Si]3(C)O[Si](C)(O1)O[Si](C)(C)O[Si]1(C)O[Si](C)(C)O[Si](C)(C)O[Si]4(C)O[Si](C)(C)O[Si](C)(O[Si](C)(O2)O3)O[Si](C)(O1)O4]

Figure 2:
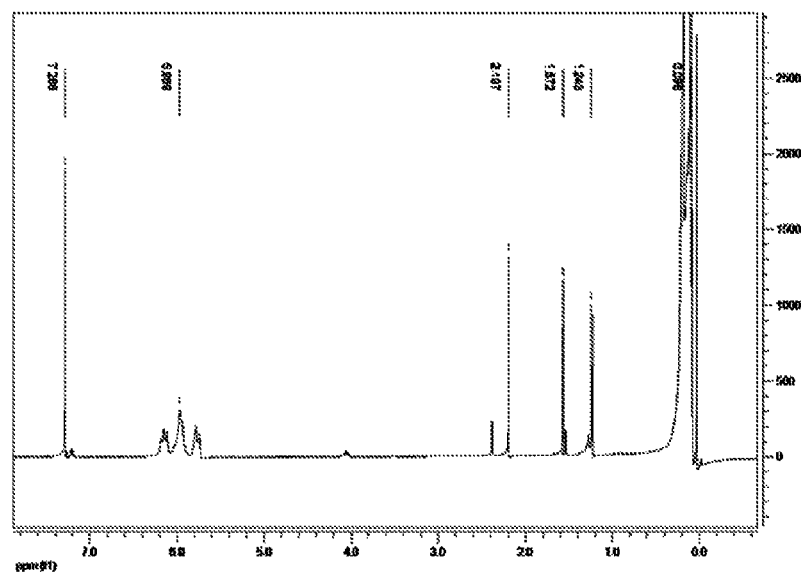
FIG. 2 is a nuclear magnetic hydrogen spectrum of an MT silicon resin.
Figure 3:
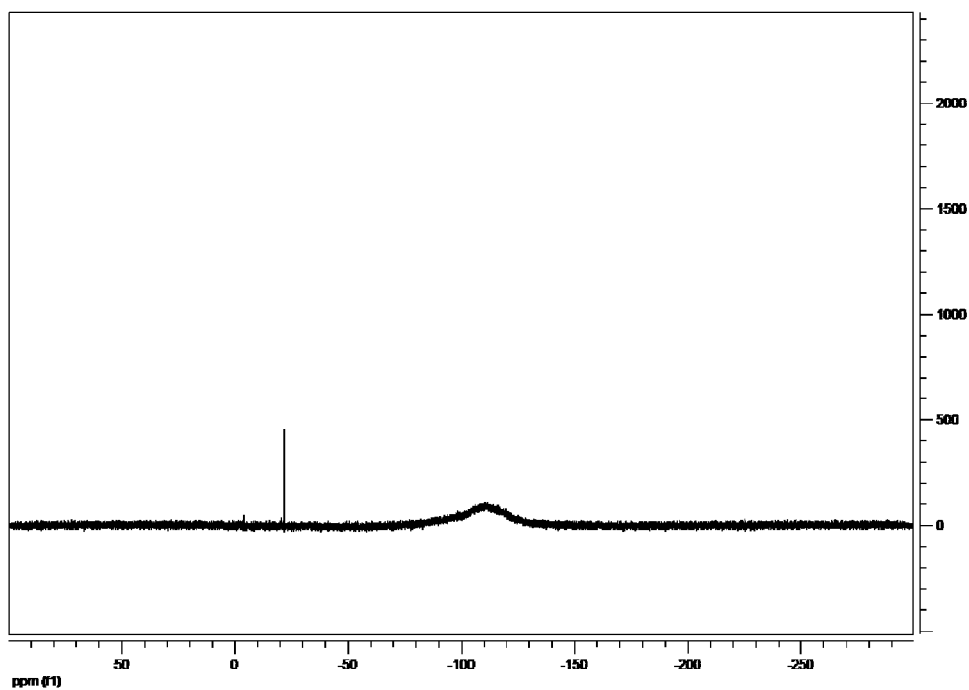
FIG. 3 is a nuclear magnetic silicon spectrum.

The spectrogram of the prepared MT resin is as shown in FIGS. 1-3.

In FIG. 1, the absorption peak of C—H is 2,965 cm$^{-1}$, the absorption peak of Si—CH$_3$ is 1,268 cm$^{-1}$, and the absorption peak of Si—O—Si is 1,018 cm$^{-1}$.

In the auxiliary material, the mass proportion of the MQ resin conforming to general formula (6) to the MT resin to the adhesion promoter is 1:1:0.3.

The preparation method for the transparent organosilicon gel adhesive comprises: respectively weighing each raw material within the above-mentioned weight range, adding same into a blender, vacuum pumping to a vacuum degree of −0.1 to −0.05 MPa, stirring for 0.5 to 3 hours using a dispersator at 50-500 RPM, respectively filling and sealing for storage after uniformly stirring, to obtain the silicon gel with components A and B.

The prepared optical transparent organosilicon gel adhesive has the properties: the appearance is colorless and transparent, the light transmittance within the range of 400-700 nm reaches 97% (measured using an ultraviolet spectrophotometer); the basic color parameter L is 90.2, a is −2.01, and b is 0.62, which have little change after humidity-freeze test (under conditions of temperature of 85° C. and humidity of 85%) and a thermal shock test, and no yellowing occurs; has the mechanical properties: the tensile strength is 0.3 MPa, the adhesion strength is good, the 180° peeling strength for glass is 0.4 KN/m, the lap shear strength reaches 1.0 MPa, and the flame resistance is good and reaches UL94-V0; and has the refractive index of 1.42.

Embodiments 2-6: A Transparent Organosilicon Gel Adhesive

A transparent organosilicon gel adhesive. The transparent organosilicon gel adhesive is prepared by mixing component A with component B in accordance with the mass proportion of 1:1.

The ingredient table of component A in embodiments 2-6 is shown as follows:

|  | base material | catalyst | auxiliary material |
| --- | --- | --- | --- |
| Embodiment 2 | 85 parts by weight | 0.2 part by weight | 25 parts by weight |
| Embodiment 3 | 95 parts by weight | 0.3 part by weight | 15 parts by weight |
| Embodiment 4 | 90 parts by weight | 0.5 part by weight | 20 parts by weight |
| Embodiment 5 | 67 parts by weight | 0.1 part by weight | 5 parts by weight |
| Embodiment 6 | 85 parts by weight | 0.15 part by weight | 30 parts by weight |

The ingredient table of component B in embodiments 2-6 is shown as follows:

|  | base material | crosslinker | inhibitor | auxiliary material |
| --- | --- | --- | --- | --- |
| Embodiment 2 | 65 parts by weight | 7 parts by weight | 0.1 part by weight | 2 parts by weight |
| Embodiment 3 | 85 parts by weight | 13 parts by weight | 0.2 part by weight | 5 parts by weight |
| Embodiment 4 | 70 parts by weight | 9 parts by weight | 0.1 part by weight | 10 parts by weight |
| Embodiment 5 | 69 parts by weight | 5 parts by weight | 0.25 part by weight | 8 parts by weight |
| Embodiment 6 | 90 parts by weight | 18 parts by weight | 0.5 part by weight | 15 parts by weight |

1. Base material used in component A in embodiments 2-6:

Embodiment 2: the compound conforming to general formula (1) is mixed with the compound conforming to general formula (2) in accordance with the mass proportion of 1:1. In general formula (1), $R_1$ represents methyl, and $R_2$, $R_3$ and $R_4$ represent vinyl; x is equal to 20, and y is equal to 20; and the viscosity of the compound conforming to general formula (1) is 7,000 cP. In general formula (2), a is equal to 20, and b is equal to 30.

Embodiment 3: the compound conforming to general formula (3). In general formula (3), c is equal to 20, d is equal to 30, and e is equal to 10.

Embodiment 4: the compound conforming to general formula (2) is mixed with the compound conforming to general formula (4) in accordance with the mass proportion of 1:1.5. In general formula (2), a is equal to 20, and b is equal to 35. In general formula (4), f is equal to 30, g is equal to 10, h is equal to 10, and i is equal to 10.

Embodiment 5: a mixture composed of the compound conforming to general formula (1), the compound conforming to general formula (2), the compound conforming to general formula (3) and the compound conforming to general formula (4) in accordance with the mass proportion of 1:0.5:1.5:1. In general formula (1), $R_1$, $R_2$ and $R_3$ represent methyl, and $R_4$ represents vinyl, wherein the content of vinyl is 0.05 wt %; and the viscosity of the compound conforming to general formula (1) is 6,500 cP. In general formula (2), a is equal to 25, and b is equal to 30. In general formula (3), c is equal to 22, d is equal to 30, and e is equal to 15. In general formula (4), f is equal to 30, g is equal to 15, h is equal to 10, and i is equal to 20.

Embodiment 6: a mixture composed of the compound conforming to general formula (2), the compound conforming to general formula (3) and the compound conforming to general formula (4) in accordance with the mass proportion of 0.8:0.5:1. In general formula (2), a is equal to 25, and b is equal to 30. In general formula (3), c is equal to 22, d is equal to 30, and e is equal to 15. In general formula (4), f is equal to 30, g is equal to 15, h is equal to 10, and i is equal to 20.

2. Catalyst used in component A in embodiments 2-6:
    embodiment 2: alcohol-modified chloroplatinic acid.
    embodiment 3: platinum-vinyl siloxane composition.
    embodiment 4: chloroplatinic acid.
    embodiment 5: a mixture composed of alcohol-modified chloroplatinic acid and platinum-vinyl siloxane composition in accordance with the mass proportion of 1:1.
    Embodiment 6: chloroplatinic acid.

3. Auxiliary Material Used in Component a in Embodiments 2-6:

Embodiment 2: the mass proportion of the MQ resin conforming to general formula (6) to the MT resin to the adhesion promoter is 1:1:1. In the MQ resin, R9 represents vinyl, wherein the content of vinyl is 4 wt %; a is equal to 1, and b is equal to 0.6; and the ratio of M to Q is 0.8. The preparation method for MT resin comprises: step 1: adding anhydrous toluene, absolute ethyl alcohol and dimethyldiethoxysilane into a reaction vessel; then under the condition of 50-70° C. and under the condition of nitrogen protection, specifically referring to both the temperature condition and the nitrogen protection condition are necessary under the condition of placing the reaction vessel in nitrogen atmosphere, first adding zinc trifluoromethanesulfonate as a catalyst into the reaction vessel, and then dropwise adding acetic acid into the reaction vessel to make the dimethyldiethoxysilane react with the acetic acid to prepare an intermediate product, wherein the mole ratio of the dimethyldiethoxysilane to the acetic acid is 1:1.1;

Step 2: removing the solvent in the reaction vessel, wherein the specific method for removing the solvent comprises heating and evaporation;

Step 3: adding 1,1,3,3-tetramethyldisiloxane into the reaction vessel under the condition of 80-100° C., and then dropwise adding acetic acid into the reaction vessel, wherein the acetic acid reacts with the intermediate product prepared in step 1 to generate silicon hydroxyl, wherein the silicon hydroxyl is endcapped by the 1,1,3,3-tetramethyldisiloxane to prepare MT resin; adding acetic anhydride with the same mass as that of the 1,1,3,3-tetramethyldisiloxane into the reaction vessel to absorb water generated in step 3; and conducting cooling, water scrubbing and distillation to obtain the pure MT organosilicon resin, wherein the mole ratio of the 1,1,3,3-tetramethyldisiloxane to the dimethyldiethoxysilane is 1:0.52, and the mole ratio of the acetic acid to the dimethyldiethoxysilane is 1:1.05.

Embodiment 3: the mass proportion of the MQ resin conforming to general formula (6) to the MT resin to the adhesion promoter is 1:0.5:1. In the MQ resin, R9 represents ethyl; a is equal to 0.6, and b is equal to 0.8; and the ratio of M to Q is 0.7. The preparation method for MT resin is the same as that in embodiment 1.

Embodiment 4: the mass proportion of the MQ resin conforming to general formula (6) to the MT resin to the adhesion promoter is 0.5:1:1. In the MQ resin, R9 represents cyclopentyl; a is equal to 0.3, and b is equal to 1; and the ratio of M to Q is 0.9. The preparation method for MT resin comprises: step 1: adding a mixture of anhydrous toluene, absolute ethyl alcohol, n-propyltrimethoxysilane and methyltri-n-propoxysilane into a reaction vessel, wherein the mass ratio of the n-propyltrimethoxysilane to the methyltri-n-propoxysilane is 1:1; and then, under the condition of 50-70° C. and under the condition of nitrogen protection, specifically referring to both temperature condition and nitrogen protection condition are necessary under the condition of placing the reaction vessel in nitrogen atmosphere, first adding praseodymium (III) trifluoromethanesulfonate as a catalyst into the reaction vessel, and then dropwise adding acetic acid into the reaction vessel to make the mixture of the n-propyltrimethoxysilane and the methyltri-n-propoxysilane react with the acetic acid to prepare an intermediate product, wherein the mole ratio of the mixture of the n-propyltrimethoxysilane and the methyltri-n-propoxysilane to the acetic acid is 1:1.1;

Step 2: removing the solvent in the reaction vessel, wherein the specific method for removing the solvent comprises heating and evaporation;

Step 3: adding 1,1,3,3-tetramethyldisiloxane into the reaction vessel under the condition of 80-100° C., and then dropwise adding acetic acid into the reaction vessel, wherein the acetic acid reacts with the intermediate product prepared in step 1 to generate silicon hydroxyl, wherein the silicon hydroxyl is endcapped by the 1,1,3,3-tetramethyldisiloxane to prepare MT resin; adding acetic anhydride with the same mass as that of the 1,1,3,3-tetramethyldisiloxane into the reaction vessel to absorb water generated in step 3; and conducting cooling, water scrubbing and distillation to obtain the pure MT organosilicon resin, wherein the mole ratio of the 1,1,3,3-tetramethyldisiloxane to the mixture of the n-propyltrimethoxysilane and the methyltri-n-propoxysilane is 1:0.5, and the mole ratio of the acetic acid to the mixture of the n-propyltrimethoxysilane and the methyltri-n-propoxysilane is 1:1.

Embodiment 5: the mass proportion of the MQ resin conforming to general formula (6) to the MT resin to the adhesion promoter is 0.5:0.8:1. In the MQ resin, R9 represents propenyl; a is equal to 0.2, and b is equal to 1.1; and the ratio of M to Q is 1.2. The preparation method for MT resin comprises: step 1: adding anhydrous toluene, absolute ethyl alcohol and trimethylethoxysilane into a reaction vessel; then under the condition of 50-70° C. and under the condition of nitrogen protection, specifically referring to both the temperature condition and the nitrogen protection condition are necessary under the condition of placing the reaction vessel in nitrogen atmosphere, first adding ytterbium trifluoromethanesulfonate and copper trifluoromethanesulfonate as catalysts into the reaction vessel, wherein the mass proportion of the ytterbium trifluoromethanesulfonate to the copper trifluoromethanesulfonate is 1:1, and then dropwise adding acetic acid into the reaction vessel to make the trimethylethoxysilane react with the acetic acid to prepare an intermediate product, wherein the mole ratio of the trimethylethoxysilane to the acetic acid is 1:1.1;

Step 2: removing the solvent in the reaction vessel, wherein the specific method for removing the solvent comprises heating and evaporation;

Step 3: adding 1,1,3,3-tetramethyldisiloxane into the reaction vessel under the condition of 80-100° C., and then dropwise adding acetic acid into the reaction vessel, wherein the acetic acid reacts with the intermediate product prepared in step 1 to generate silicon hydroxyl, wherein the silicon hydroxyl is endcapped by the 1,1,3,3-tetramethyldisiloxane to prepare MT resin; adding acetic anhydride with the same mass as that of the 1,1,3,3-tetramethyldisiloxane into the reaction vessel to absorb water generated in step 3; and conducting cooling, water scrubbing and distillation to obtain the pure MT organosilicon resin, wherein the mole ratio of the 1,1,3,3-tetramethyldisiloxane to the trimethylethoxysilane is 1:0.55, and the mole ratio of the acetic acid to the trimethylethoxysilane is 1:1.

Embodiment 6: the mass proportion of the MQ resin conforming to general formula (6) to the MT resin to the adhesion promoter is 0.7:0.8:1. In the MQ resin, R9 represents butyl; a is equal to 1, and b is equal to 0.3; and the ratio of M to Q is 0.9. The MT resin is prepared using the prior art, specifically, a technical solution disclosed in the Chinese invention patent entitled "phenyl-containing MT resin and preparation method therefor", with the publication date of Jan. 16, 2013 and the publication number of CN102875810A.

See the following table for the raw material formula of the adhesion promoter in auxiliary material used in the component A in embodiments 2-6:

| | q | r | s | t | u | v | w general formula (2) | w general formula (3) | w general formula (4) |
|---|---|---|---|---|---|---|---|---|---|
| Embodiment 2 | 4 | 3 | 7 | 3 | 4 | 8 | | | |
| Embodiment 3 | | | | | | 6 | 3 | 5 | 7 |
| Embodiment 4 | | | | | 10 | 8 | | | 10 |
| Embodiment 5 | 3 | 6 | 10 | 6 | 5 | 7 | | 12 | |
| Embodiment 6 | 6 | 2 | 9 | 4 | 6 | 12 | 1 | | 9 |

Note:
embodiment 2: the mass proportion of-component C to component D is 90:10.

Embodiment 3: the mass proportion of component C to component D is 40:60. The mass proportion of the compound conforming to general formula (2), to the compound conforming to general formula (3) to the compound conforming to general formula (4) is 1:2:1.

Embodiment 4: the mass proportion of component C to component D is 50:60. The mass proportion of the compound conforming to general formula (2) to the compound conforming to general formula (4) is 1:2.

Embodiment 5: the mass proportion of component C to component D is 45:55. The mass proportion of the compound conforming to general formula (1) to the compound conforming to general formula (3) is 1:1.

Embodiment 6: the mass proportion of component C to component D is 20:80. The mass proportion of the compound conforming to general formula (1), to the compound conforming to general formula (2) to the compound conforming to general formula (4) is 1:1:1.

4. Base Material Used in Component B

Embodiment 2: the compound conforming to general formula (1) is mixed with the compound conforming to general formula (2) in accordance with the mass proportion of 1:1. In general formula (1), $R_1$ represents methyl, and $R_2$, $R_3$ and $R_4$ represent vinyl; x is equal to 20, and y is equal to 20; and the viscosity of the compound conforming to general formula (1) is 7,000 cP. In general formula (2), a is equal to 20, and b is equal to 30.

Embodiment 3: the compound conforming to general formula (2) is mixed with the compound conforming to general formula (4) in accordance with the mass proportion of 1:1.5. In general formula (2), a is equal to 20, and b is equal to 35. In general formula (4), f is equal to 30, g is equal to 10, h is equal to 10, and i is equal to 10.

Embodiment 4: the compound conforming to general formula (3). In general formula (3), c is equal to 22, d is equal to 30, and e is equal to 10.

Embodiment 5: a mixture composed of the compound conforming to general formula (1), the compound conforming to general formula (2), the compound conforming to general formula (3) and the compound conforming to general formula (4) in accordance with the mass proportion of 1:0.5:1.5:1. In general formula (1), $R_1$, $R_2$ and $R_3$ represent methyl, and $R_4$ represents vinyl, wherein the content of vinyl is 0.05 wt %; and the viscosity of the compound conforming to general formula (1) is 6,500 cP. In general formula (2), a is equal to 25, and b is equal to 30. In general formula (3), c is equal to 22, d is equal to 30, and e is equal to 15. In general formula (4), f is equal to 30, g is equal to 15, h is equal to 10, and i is equal to 20.

Embodiment 6: a mixture composed of the compound conforming to general formula (2), the compound conforming to general formula (3) and the compound conforming to general formula (4) in accordance with the mass proportion of 0.8:0.5:1. In general formula (2), a is equal to 25, and b is equal to 30. In general formula (3), c is equal to 22, d is equal to 30, and e is equal to 15. In general formula (4), f is equal to 30, g is equal to 15, h is equal to 10, and i is equal to 20.

5. Crosslinker Used in Component B in Embodiments 2-6:

Embodiment 2: $R_5$ and $R_8$ in the compound conforming to general formula (5) represent methyl, and $R_6$ and $R_7$ represent hydroxyl; j is equal to 12, and k is equal to 1; and the viscosity of the compound conforming to general formula (5) is 100 cP.

Embodiment 3: $R_6$, $R_7$ and $R_8$ in the compound conforming to general formula (5) represent methyl, and $R_5$ represents hydroxyl; j is equal to 30, and k is equal to 10; and the viscosity of the compound conforming to general formula (5) is 80 cP.

Embodiment 4: $R_8$ in the compound conforming to general formula (5) represents methyl, and $R_5$, $R_6$ and $R_7$ represent hydroxyl; j is equal to 15, and k is equal to 10; the hydrogen content of the compound conforming to general formula (5) is 3 wt %; and the viscosity of the compound conforming to general formula (5) is 200 cP.

Embodiment 5: the same as embodiment 4.
Embodiment 6: the same as embodiment 3.

6. Inhibitor Used in Component B in Embodiments 2-6:

Embodiment 2: tetravinyl tetramethylcyclo tetrasiloxane.
Embodiment 3: 3-phenyl-1-butyn-3-ol.
Embodiment 4: 5-dimethyl-1-hexyn-3-ol.
Embodiment 5: a mixture composed of 3-methyl-1-butyn-3-ol and 2-methyl-3-butyn-2-ol in accordance with the mass proportion of 1:1.
Embodiment 6: 3-methyl-1-pentyn-3-ol.

Embodiment 2: the mass proportion of the MQ resin conforming to general formula (6) to the MT resin to the adhesion promoter is 1:1:1. In the MQ resin, $R_9$ represents vinyl, wherein the content of vinyl is 4 wt %; a is equal to 1, and b is equal to 0.6; and the ratio of M to Q is 0.8. The preparation method for MT resin comprises: step 1: adding anhydrous toluene, absolute ethyl alcohol and dimethyldiethoxysilane into a reaction vessel; then under the condition of 50-70° C. and under the condition of nitrogen protection, specifically referring to both the temperature condition and the nitrogen protection condition are necessary under the condition of placing the reaction vessel in nitrogen atmosphere, first adding zinc trifluoromethanesulfonate as a catalyst into the reaction vessel, and then dropwise adding acetic acid into the reaction vessel to make the dimethyldiethoxysilane react with the acetic acid to prepare an intermediate product, wherein the mole ratio of the dimethyldiethoxysilane to the acetic acid is 1:1.1;

Step 2: removing the solvent in the reaction vessel, wherein the specific method for removing the solvent comprises heating and evaporation;

Step 3: adding 1,1,3,3-tetramethyldisiloxane into the reaction vessel under the condition of 80-100° C., and then dropwise adding acetic acid into the reaction vessel, wherein the acetic acid reacts with the intermediate product prepared in step 1 to generate silicon hydroxyl, wherein the silicon hydroxyl is endcapped by the 1,1,3,3-tetramethyldisiloxane to prepare MT resin; adding acetic anhydride with the same mass as that of the 1,1,3,3-tetramethyldisiloxane into the reaction vessel to absorb water generated in step 3; and conducting cooling, water scrubbing and distillation to obtain the pure MT organosilicon resin, wherein the mole ratio of the 1,1,3,3-tetramethyldisiloxane to the dimethyldiethoxysilane is 1:0.52, and the mole ratio of the acetic acid to the dimethyldiethoxysilane is 1:1.05.

Embodiment 3: the mass proportion of the MQ resin conforming to general formula (6) to the MT resin to the adhesion promoter is 0.7:0.8:1. In the MQ resin, $R_9$ represents butyl; a is equal to 1, and b is equal to 0.3; and the ratio of M to Q is 0.9. The MT resin is prepared using the prior art, specifically, a technical solution disclosed in the Chinese invention patent entitled "phenyl-containing MT resin and preparation method therefor", with the publication date of Jan. 16, 2013 and the publication number of CN102875810A.

Embodiment 4: the mass proportion of the MQ resin conforming to general formula (6) to the MT resin to the adhesion promoter is 0.5:1:1. In the MQ resin, $R_9$ represents cyclopentyl; a is equal to 0.3, and b is equal to 1; and the ratio of M to Q is 0.9. The preparation method for MT resin comprises: step 1: adding a mixture of anhydrous toluene, absolute ethyl alcohol, n-propyltrimethoxysilane and methyltri-n-propoxysilane into a reaction vessel, wherein the mass ratio of the n-propyltrimethoxysilane to the methyltri-n-propoxysilane is 1:1; and then, under the condition of 50-70° C. and under the condition of nitrogen protection, specifically referring to both temperature condition and nitrogen protection condition are necessary under the condition of placing the reaction vessel in nitrogen atmosphere, first adding praseodymium (III) trifluoromethanesulfonate as a catalyst into the reaction vessel, and then dropwise adding acetic acid into the reaction vessel to make the mixture of the n-propyltrimethoxysilane and the methyltri-n-propoxysilane react with the acetic acid to prepare an intermediate product, wherein the mole ratio of the mixture of the n-propyltrimethoxysilane and the methyltri-n-propoxysilane to the acetic acid is 1:1.1;

Step 2: removing the solvent in the reaction vessel, wherein the specific method for removing the solvent comprises heating and evaporation;

Step 3: adding 1,1,3,3-tetramethyldisiloxane into the reaction vessel under the condition of 80-100° C., and then dropwise adding acetic acid into the reaction vessel, wherein the acetic acid reacts with the intermediate product prepared in step 1 to generate silicon hydroxyl, wherein the silicon hydroxyl is endcapped by the 1,1,3,3-tetramethyldisiloxane to prepare MT resin; adding acetic anhydride with the same mass as that of the 1,1,3,3-tetramethyldisiloxane into the reaction vessel to absorb water generated in step 3; and conducting cooling, water scrubbing and distillation to obtain the pure MT organosilicon resin, wherein the mole ratio of the 1,1,3,3-tetramethyldisiloxane to the mixture of the n-propyltrimethoxysilane and the methyltri-n-propoxysilane is 1:0.5, and the mole ratio of the acetic acid to the mixture of the n-propyltrimethoxysilane and the methyltri-n-propoxysilane is 1:1.

Embodiment 5: the mass proportion of the MQ resin conforming to general formula (6) to the MT resin to the adhesion promoter is 0.5:0.8:1. In the MQ resin, $R_9$ represents propenyl; a is equal to 0.2, and b is equal to 1.1; and the ratio of M to Q is 1.2. The preparation method for MT resin comprises: step 1: adding anhydrous toluene, absolute ethyl alcohol and trimethylethoxysilane into a reaction vessel; then under the condition of 50-70° C. and under the condition of nitrogen protection, specifically referring to both the temperature condition and the nitrogen protection condition are necessary under the condition of placing the reaction vessel in nitrogen atmosphere, first adding ytterbium trifluoromethanesulfonate and copper trifluoromethanesulfonate ascatalysts into the reaction vessel, wherein the mass proportion of the ytterbium trifluoromethanesulfonate to the copper trifluoromethanesulfonate is 1:1, and then dropwise adding acetic acid into the reaction vessel to make the trimethylethoxysilane react with the acetic acid to prepare an intermediate product, wherein the mole ratio of the trimethylethoxysilane to the acetic acid is 1:1.1;

Step 2: removing the solvent in the reaction vessel, wherein the specific method for removing the solvent comprises heating and evaporation;

Step 3: adding 1,1,3,3-tetramethyldisiloxane into the reaction vessel under the condition of 80-100° C., and then dropwise adding acetic acid into the reaction vessel, wherein the acetic acid reacts with the intermediate product prepared in step 1 to generate silicon hydroxyl, the silicon hydroxyl is endcapped by the 1,1,3,3-tetramethyldisiloxane to prepare MT resin; adding acetic anhydride with the same mass as that of the 1,1,3,3-tetramethyldisiloxane into the reaction vessel to absorb water generated in step 3; and conducting cooling, water scrubbing and distillation to obtain the pure MT organosilicon resin, wherein the mole ratio of the 1,1,3,3-tetramethyldisiloxane to the trimethylethoxysilane is 1:0.55, and the mole ratio of the acetic acid to the trimethylethoxysilane is 1:1.

Embodiment 6: the mass proportion of the MQ resin conforming to general formula (6) to the MT resin to the adhesion promoter is 1:0.5:1. In the MQ resin, R9 represents ethyl; a is equal to 0.6, and b is equal to 0.8; and the ratio of M to Q is 0.7. The preparation method for MT resin is the same as that in embodiment 1.

See the following table for the raw material formula of the adhesion promoter in the auxiliary material used in component D in embodiments 2-6:

| | q | r | s | t | u | v | w general formula (8) | w general formula (9) | w general formula (10) |
|---|---|---|---|---|---|---|---|---|---|
| Embodiment 2 | 4 | 3 | 7 | 3 | 4 | 8 | | | |
| Embodiment 3 | | | | | | 6 | 3 | 5 | 7 |
| Embodiment 4 | | | | | | 10 | 8 | | 10 |
| Embodiment 5 | 3 | 6 | 10 | 6 | 5 | 7 | | 12 | |
| Embodiment 6 | 6 | 2 | 9 | 4 | 6 | 12 | 1 | | 9 |

Note:
embodiment 2: the mass proportion of component C to component D is 90:10.

Embodiment 3: the mass proportion of component C to component D is 40:60. The mass proportion of the compound conforming to general formula (2), to the compound conforming to general formula (3) to the compound conforming to general formula (4) is 1:2:1.

Embodiment 4: the mass proportion of component C to component D is 50:50. The mass proportion of the compound conforming to general formula (2) to the compound conforming to general formula (4) is 1:2.

Embodiment 5: the mass proportion of component C to component D is 45:55. The mass proportion of the compound conforming to general formula (1) to the compound conforming to general formula (3) is 1:1.

Embodiment 6: the mass proportion of component C to component D is 20:80. The mass proportion of the compound conforming to general formula (1), to the compound conforming to general formula (2) to the compound conforming to general formula (4) is 1:1:1.

General formulas (1)-(11) in embodiments 2-6 are the same as those in embodiment 1.

The preparation method for transparent organosilicon gel adhesives in embodiments 2-6 is the same as that in embodiment 1.

The optical transparent organosilicon gel adhesive prepared in embodiment 2 has the properties: the appearance is colorless and transparent, the light transmittance within the range of 400-700 nm reaches 98% (measured using an ultraviolet spectrophotometer), the basic color parameter L is 90.2, a is −2.01, and b is 0.62, which have little change after a humidity-freeze test (under conditions of temperature of 85° C. and humidity of 85%) and a thermal shock test, and no yellowing occurs; has the mechanical properties: the tensile strength is 0.25 MPa, the adhesion strength is good, the 180° peeling strength for glass is 0.4 KN/m, the lap shear strength reaches 1.0 MPa, and the flame resistance is good and reaches UL94-V0; and has the refractive index of 1.43.

The optical transparent organosilicon gel adhesive prepared in embodiment 3 has the properties: the appearance is colorless and transparent, the light transmittance within the range of 400-700 nm reaches 95% (measured using an ultraviolet spectrophotometer), the basic color parameter L is 90.2, a is −2.01, and b is 0.62, which have little change after a humidity-freeze test (under conditions of temperature of 85° C. and humidity of 85%) and a thermal shock test, and no yellowing occurs; has the mechanical properties: the tensile strength is 0.20 MPa, the adhesion strength is good, the 180° peeling strength for glass is 0.4 KN/m, the lap shear strength reaches 1.0 MPa, and the flame resistance is good and reaches UL94-V0; and has the refractive index of 1.40.

The optical transparent organosilicon gel adhesive prepared in embodiment 4 has the properties: the appearance is colorless and transparent, the light transmittance within the range of 400-700 nm reaches 96.5% (measured using an ultraviolet spectrophotometer), the basic color parameter L is 90.2, a is −2.01, and b is 0.62, which have little change after a humidity-freeze test (under conditions of temperature of 85° C. and humidity of 85%) and a thermal shock test, and no yellowing occurs; has mechanical properties: the tensile strength is 0.28 MPa, the adhesion strength is good, the 180° peeling strength for glass is 0.4 KN/m, the lap shear strength reaches 1.0 MPa, and the flame resistance is good and reaches UL94-V0; and has the refractive index of 1.42.

The optical transparent organosilicon gel adhesive prepared in embodiment 5 has the properties: the appearance is colorless and transparent, the light transmittance within the range of 400-700 nm reaches 95% (measured using an ultraviolet spectrophotometer), the basic color parameter L is 90.2, a is −2.01, and b is 0.62, which have little change after a humidity-freeze test (under conditions of temperature of 85° C. and humidity of 85%) and a thermal shock test, and no yellowing occurs; has the mechanical properties: the tensile strength is 0.25 MPa, the adhesion strength is good, the 180° peeling strength for glass is 0.41 KN/m, the lap shear strength reaches 1.0 MPa, and the flame resistance is good and reaches UL94-V0; and has the refractive index of 1.40.

The optical transparent organosilicon gel adhesive prepared in embodiment 6 has the properties: the appearance is colorless and transparent, the light transmittance within the range of 400-700 nm reaches 97% (measured using an ultraviolet spectrophotometer), the basic color parameter L is 90.2, a is −2.01, and b is 0.62, which have little change after a humidity-freeze test (under conditions of temperature of 85° C. and humidity of 85%) and a thermal shock test, and no yellowing occurs; has the mechanical properties: the tensile strength is 0.25 MPa, the adhesion strength is good, the 180° peeling strength for glass is 0.4 KN/m, the lap shear strength reaches 1.0 MPa, and the flame resistance is good and reaches UL94-V0; and has the refractive index of 1.43.

The above-mentioned embodiments only aim to explain the technical conception and feature of the present invention, and aim to make those skilled in the art know the content of the present invention and implement same accordingly, which cannot limit the protection scope of the present invention. Any equivalent change or modification made according to the spirit substance of the present invention shall be covered within the protection scope of the present invention.

The invention claimed is:

1. A transparent organosilicon gel adhesive, characterized in that the transparent organosilicon gel adhesive is prepared by mixing component A with component B in accordance with the mass proportion of 1:1, wherein the component A is composed of materials of the following proportion by weight:

| base material | 60-95 parts by weight; |
|---|---|
| catalyst | 0.1-0.5 part by weight; |
| auxiliary material | 5-40 parts by weight; | wherein the catalyst is a platinum-group metal catalyst;

the component B is composed of materials of the following proportion by weight:

| base material | 60-95 parts by weight; |
|---|---|
| crosslinker | 5-20 parts by weight; |
| inhibitor | 0.1-0.5 part by weight; |
| auxiliary material | 1-20 parts by weight; | wherein the base material is at least one of compounds conforming to general formula (1), compounds conforming to general formula (2), compounds conforming to general formula (3) and compounds conforming to general formula (4);

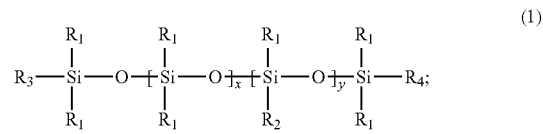

where $R_1$ represents alkyl with the number of carbon atoms of 1 to 6; $R_2$, $R_3$ and $R_4$ represent alkyl with the number of carbon atoms of 1 to 6 or alkenyl with the number of carbon atoms of 2 to 8 respectively and independently; and x is equal to 5 to 40, and y is equal to 1 to 30;

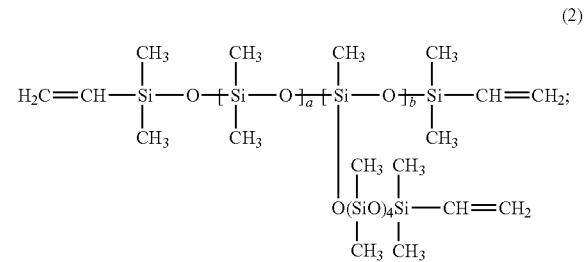

where a is greater than or equal to 20, and b is greater than or equal to 30;

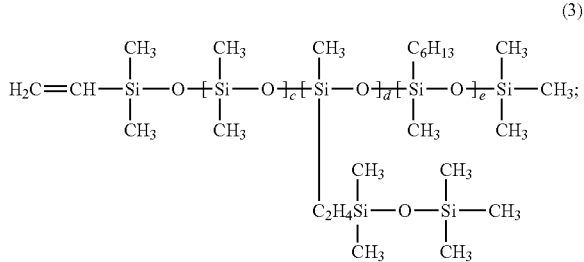

where c is greater than or equal to 20, d is greater than or equal to 30, and e is greater than or equal to 10;

$$H_2C=CH-\underset{\underset{CH_3}{|}}{\overset{\overset{CH_3}{|}}{Si}}-O-\underset{\underset{CH_3}{|}}{\overset{\overset{CH_3}{|}}{Si}}-O\frac{}{f}\underset{\underset{|}{|}}{\overset{\overset{CH_3}{|}}{Si}}-O\frac{}{g}\underset{\underset{CH_3}{|}}{\overset{\overset{C_6H_{13}}{|}}{Si}}-O\frac{}{h}\underset{\underset{CH_3}{|}}{\overset{\overset{CH_3}{|}}{Si}}-CH_3 \quad (4)$$

$$O-\underset{\underset{CH_3}{|}}{\overset{\overset{CH_3}{|}}{Si}}-O-\underset{\underset{CH=CH_2}{|}}{\overset{\overset{CH_3}{|}}{Si}}-O\frac{}{i}\underset{\underset{CH_3}{|}}{\overset{\overset{CH_3}{|}}{Si}}-CH=CH_2;$$

where f is greater than or equal to 30, g is greater than or equal to 10, h is greater than or equal to 10, and i is greater than or equal to 10;

the crosslinker is at least one of compounds conforming to general formula (5);

$$R_6-\underset{\underset{R_8}{|}}{\overset{\overset{R_8}{|}}{Si}}-O\frac{}{j}\underset{\underset{R_8}{|}}{\overset{\overset{R_8}{|}}{Si}}-O\frac{}{k}\underset{\underset{R_5}{|}}{\overset{\overset{R_8}{|}}{Si}}-O\frac{}{}\underset{\underset{R_8}{|}}{\overset{\overset{R_8}{|}}{Si}}-R_7; \quad (5)$$

where $R_8$ represents alkyl with the number of carbon atoms of 1 to 6; $R_5$, $R_6$ and $R_7$ represent alkyl with the number of carbon atoms of 1 to 6 or hydroxyl respectively and independently, and at least one of $R_5$, $R_6$ and $R_7$ is hydroxyl; and j is equal to 10 to 30, and k is equal to 1 to 10;

the auxiliary material contains MQ resin conforming to general formula (6) or a mixture of MQ resin conforming to general formula (6) and vinyl end silicone oil, wherein the mass proportion of the MQ resin to the vinyl end silicone oil is 0.3 to 0.4:0.6 to 0.7;

the auxiliary material also contains MT resin or a mixture of MT resin and vinyl end silicone oil, wherein the mass proportion of the MT resin to the vinyl end silicone oil is 0.3 to 0.4:0.6 to 0.7;

$$(Me_3SiO_{0.5})_l(R_9Me_2SiO_{0.5})_m(SiO_2) \quad (6);$$

where Me represents methyl; $R_9$ represents alkyl, cyclopropyl, cyclobutyl, cyclopentyl or cyclohexyl with the number of carbon atoms of 1 to 6 or alkenyl with the number of carbon atoms of 2 to 7; and l is equal to 0 to 1.5, m is equal to 0 to 1.5, and l+m is equal to 1.3 to 1.8;

the auxiliary material also contains an adhesion promoter, wherein the adhesion promoter is prepared by mixing component C and component D, wherein the mass proportion of the component C to the component D is 10 to 90:10 to 90; the component C is at least one of compounds conforming to general formula (7), compounds conforming to general formula (8), compounds conforming to general formula (9) and compounds conforming to general formula (10); the component D is at least one of compounds conforming to general formula (11);

$$\underset{O}{\triangle}(CH_2)_q-\underset{\underset{CH_3}{|}}{\overset{\overset{CH_3}{|}}{Si}}-O-\left[\underset{\underset{CH_3}{|}}{\overset{\overset{HC=CH_2}{|}}{Si}}-O\right]_r-\left[\underset{\underset{CH_3}{|}}{\overset{\overset{CH_3}{|}}{Si}}-O\right]_s- \quad (7)$$

$$-\left[\underset{\underset{CH_3}{|}}{\overset{\overset{HC=CH_2}{|}}{Si}}-O\right]_t\underset{\underset{CH_3}{|}}{\overset{\overset{CH_3}{|}}{Si}}-(CH_2)_u\underset{O}{\triangle};$$

$$\underset{H_2C}{\overset{O}{\triangle}}CH-CH_2-O-CH_2-CH_2-\underset{\underset{OCH_3}{|}}{\overset{\overset{OCH_3}{|}}{Si}}-O-\underset{\underset{CH_3}{|}}{\overset{\overset{CH_3}{|}}{Si}}-O\frac{}{w} \quad (8)$$

$$-\underset{\underset{CH_3}{|}}{\overset{\overset{CH_3}{|}}{Si}}-CH_2-CH_2-\underset{\underset{OCH_3}{|}}{\overset{\overset{OCH_3}{|}}{Si}}-OCH_3;$$

$$\underset{H_2C}{\overset{O}{\triangle}}CH-CH_2-O-CH_2-CH_2-\underset{\underset{CH_3}{|}}{\overset{\overset{CH_3}{|}}{Si}}-O-\underset{\underset{CH_3}{|}}{\overset{\overset{OCH_3}{|}}{Si}}-O\frac{}{w} \quad (9)$$

$$-\underset{\underset{CH_3}{|}}{\overset{\overset{CH_3}{|}}{Si}}-CH_2-CH_2-\underset{\underset{OCH_2CH_3}{|}}{\overset{\overset{OCH_2CH_3}{|}}{Si}}-OCH_2CH_3;$$

$$\underset{H_2C}{\overset{O}{\triangle}}CH-CH_2-O-CH_2-CH_2-\underset{\underset{CH_3}{|}}{\overset{\overset{CH_3}{|}}{Si}}-O-\underset{\underset{CH_3}{|}}{\overset{\overset{OCH_3}{|}}{Si}}-O\frac{}{w} \quad (10)$$

$$-\underset{\underset{CH_3}{|}}{\overset{\overset{CH_3}{|}}{Si}}-CH_2-CH_2-\underset{\underset{CH_3}{|}}{\overset{\overset{CH_3}{|}}{Si}}-CH=CH_2;$$

$$CH_3O-\underset{\underset{CH_3}{|}}{\overset{\overset{OCH_3}{|}}{Si}}-O-\underset{\underset{CH_3}{|}}{\overset{\overset{HC=CH_2}{|}}{Si}}-O-\left[\underset{\underset{CH_3}{|}}{\overset{\overset{CH_3}{|}}{Si}}-O\right]_v-\underset{\underset{CH_3}{|}}{\overset{\overset{CH=CH_2}{|}}{Si}}-O-\underset{\underset{CH_3}{|}}{\overset{\overset{OCH_3}{|}}{Si}}-OCH_3; \quad (11)$$

where q is equal to 3 to 6, r is equal to 2 to 6, s is equal to 6 to 12, t is equal to 2 to 6, u is equal to 3 to 6, v is equal to 6 to 12, and w is equal to 1 to 12;

the inhibitor is at least one of alkynol compounds and alkenyl-containing cyclic siloxane oligomers.

2. The transparent organosilicon gel adhesive of claim 1, characterized in that the platinum-group metal catalyst is one of chloroplatinic acid, alcohol-modified chloroplatinic acid, platinum-vinyl siloxane composition, chloroplatinic acid-alkene complex and platinum-alkene composition.

3. The transparent organosilicon gel adhesive of claim 2, characterized in that the platinum-group metal catalyst is platinum-vinyl siloxane composition.

4. The transparent organosilicon gel adhesive of claim 1, characterized in that the inhibitor is selected from 3-methyl-1-butyn-3-ol, 3-methyl-1-pentyn-3-ol, 3,5-dimethyl-1-hexyn-3-ol, 1-hexynyl-1-cyclohexanol, 3-phenyl-1-butyn-3-ol, 2-methyl-3-butyn-2-ol, tetravinyl tetramethylcyclo tetrasiloxane, pyridine and unsaturated acylamide.

5. The transparent organosilicon gel adhesive of claim 1, characterized in that the alkenyl group in the compound conforming to general formula (1) is selected from the group consisting of vinyl, allyl, butenyl, pentenyl, hexenyl or heptenyl.

6. The transparent organosilicon gel adhesive of claim 1, characterized in that $R_1$ and $R_2$ in the compound conforming to general formula (1) represent methyl, and $R_3$ and $R_4$ represent vinyl, wherein the content of vinyl is 0.005-0.5 wt %; and the viscosity of the compound conforming to general formula (1) is 300-30,000 cP;

alternatively, $R_1$ in the compound conforming to general formula (1) represents methyl, and $R_2$, $R_3$ and $R_4$ represent vinyl, wherein the content of vinyl is 0.01-10 wt %; and the viscosity of the compound conforming to general formula (1) is 50-10,000 cP;

alternatively, $R_1$, $R_2$ and $R_3$ in the compound conforming to general formula (1) represent methyl, and $R_4$ represent vinyl, wherein the content of vinyl is 0.001-0.5 wt %; and the viscosity of the compound conforming to general formula (1) is 500-10,000 cP.

7. The transparent organosilicon gel adhesive of claim 1, characterized in that $R_5$ and $R_8$ in the compound conforming to general formula (5) represent methyl, and $R_6$ and $R_7$ represent hydroxyl, wherein the content of hydrogen contained in the compound conforming to general formula (5) is 0.005-1 wt %; and the viscosity of the compound conforming to general formula (5) is 5-200 cP;

alternatively, $R_6$, $R_7$ and $R_8$ in the compound conforming to general formula (5) represent methyl, and $R_5$ represents hydroxyl, wherein the content of hydrogen contained in the compound conforming to general formula (5) is 0.005-2 wt %; and the viscosity of the compound conforming to general formula (5) is 10-100 cP;

alternatively, $R_8$ in the compound conforming to general formula (5) represents methyl, and $R_5$, $R_6$ and $R_7$ represent hydroxyl, wherein the content of hydrogen contained in the compound conforming to general formula (5) is 0.001-10 wt %; and the viscosity of the compound conforming to general formula (5) is 10-300 cP.

8. The transparent organosilicon gel adhesive of claim 1, characterized in that in the MQ resin, $R_9$ represents methyl, wherein the ratio of M to Q of the MQ resin is 0.6 to 1.2;

alternatively, in the MQ resin, $R_9$ represents vinyl, wherein the content of vinyl is less than or equal to 10 wt %.

9. The transparent organosilicon gel adhesive of claim 8, characterized in that the ratio of M to Q of the MQ resin is 0.8.

* * * * *